(12) United States Patent
Hu et al.

(10) Patent No.: US 12,478,032 B2
(45) Date of Patent: Nov. 25, 2025

(54) VACUUM PACKAGING DEVICE

(71) Applicant: Shenzhen Longood Intelligent Electric Co.,Ltd, ShenZhen (CN)

(72) Inventors: Wenfeng Hu, ShenZhen (CN); Jun Zhu, ShenZhen (CN); Guanlin Li, ShenZhen (CN)

(73) Assignee: Shenzhen Longood Intelligent Electric Co., Ltd, ShenZhen (CN)

( * ) Notice: Subject to any disclaimer, the term of this patent is extended or adjusted under 35 U.S.C. 154(b) by 81 days.

(21) Appl. No.: 18/541,078

(22) Filed: Dec. 15, 2023

(65) Prior Publication Data
US 2025/0048993 A1 Feb. 13, 2025

(30) Foreign Application Priority Data
Aug. 10, 2023 (CN) .......................... 202311015439.7

(51) Int. Cl.
*A01K 1/01* (2006.01)
*B29C 65/00* (2006.01)
(Continued)

(52) U.S. Cl.
CPC ........ *A01K 1/0114* (2013.01); *B29C 66/8221* (2013.01); *B29C 66/824* (2013.01); *B65B 31/048* (2013.01); *B65B 43/465* (2013.01); *B65B 51/10* (2013.01); *B65F 1/16* (2013.01); *B65F 1/1623* (2013.01)

(58) Field of Classification Search
CPC . A01K 1/0114; B29C 65/223; B29C 66/1122; B29C 66/232; B29C 66/43121; B29C 66/73921; B29C 66/8221; B29C 66/824; B29C 66/8324; B29C 66/849; B29L 2031/7128; B65B 31/048; B65B 31/06; B65B 31/08; B65B 43/465; B65B 51/10; B65B 51/146; B65B 51/30; B65B 61/10; B65F 1/068; B65F 1/16; B65F 1/1623; B65F 2210/167; B65F 2210/188
See application file for complete search history.

(56) References Cited

U.S. PATENT DOCUMENTS 1,380,011 A * 5/1921 Pelc ...................... B65F 1/1623
  220/348
1,503,926 A * 8/1924 Staubli .................. B65F 1/1447
  220/821
(Continued)

*Primary Examiner* — Robert F Long
*Assistant Examiner* — Eduardo R Ferrero
(74) *Attorney, Agent, or Firm* — JEEN IP LAW, LLC

(57) ABSTRACT

The present invention discloses a vacuum packaging device having a hollow area on the shell that allows garbage bags pass through vertically. The clamping portion of the fixture partially closes and clamps the garbage bag located in the hollow area through a closing action, and the poking portion on the inner side of the clamping portion pokes out an air hole in the locale; after the vacuum pumping mechanism vacuums the garbage bag containing waste cat litter through the air hole, so that the garbage bag containing waste cat litter is vacuum sealed and packaged. the present invention having a simple structure can automatically implement vacuum packaging to isolate waste cat litter from the outside and effectively address the pollution caused by bacterial growth and fermentation after long-term storage of waste cat litter.

11 Claims, 4 Drawing Sheets

(51) Int. Cl.
  *B65B 31/04* (2006.01)
  *B65B 43/46* (2006.01)
  *B65B 51/10* (2006.01)
  *B65F 1/16* (2006.01)

(56) References Cited

U.S. PATENT DOCUMENTS

| | | | | |
|---|---|---|---|---|
| 2,387,812 | A * | 10/1945 | Sonneborn | B65B 31/08 53/511 |
| 3,317,097 | A * | 5/1967 | Giordano | A45C 11/24 220/345.5 |
| 3,322,603 | A * | 5/1967 | Grasso | B29C 66/80 493/5 |
| 3,382,642 | A * | 5/1968 | Shaw | B65B 31/08 53/469 |
| 3,401,409 | A * | 9/1968 | Ekrut | A47K 11/026 4/484 |
| 3,452,368 | A * | 7/1969 | Couper | A47K 11/026 53/567 |
| 3,469,364 | A * | 9/1969 | Biscoff | B65B 1/24 53/433 |
| 3,478,485 | A * | 11/1969 | Hechenleitner | B65B 9/20 53/550 |
| 3,995,407 | A * | 12/1976 | Segale | B65B 51/303 53/511 |
| 4,001,075 | A * | 1/1977 | Menzner | B29C 65/18 156/581 |
| 4,300,976 | A * | 11/1981 | Wehr | C08F 22/00 100/33 PB |
| 4,378,266 | A * | 3/1983 | Gerken | B31B 70/99 219/508 |
| 4,502,610 | A * | 3/1985 | Todd | B65D 88/126 220/345.5 |
| 4,592,192 | A * | 6/1986 | Jacob | B30B 9/3046 53/298 |
| 4,650,535 | A * | 3/1987 | Bennett | B29C 66/8742 493/207 |
| 4,779,398 | A * | 10/1988 | Glandon | B65B 31/022 53/512 |
| 5,027,578 | A * | 7/1991 | Natterer | B65F 1/06 53/527 |
| 5,042,683 | A * | 8/1991 | Shaw | B65D 43/20 220/345.5 |
| 5,131,102 | A * | 7/1992 | Salley | E04H 4/084 296/100.1 |
| 5,251,775 | A * | 10/1993 | Kruzick | B65F 1/1623 220/908 |
| 5,458,730 | A * | 10/1995 | Soodak | B29C 66/81427 156/583.8 |
| 5,507,773 | A * | 4/1996 | Huitema | A61B 17/29 606/174 |
| 5,730,451 | A * | 3/1998 | Walker | B65F 1/1468 220/908 |
| 5,992,680 | A * | 11/1999 | Smith | B65F 1/1646 220/812 |
| 5,993,464 | A * | 11/1999 | Knodel | A61B 17/115 606/139 |
| 6,131,371 | A * | 10/2000 | Esser | B65B 31/00 53/433 |
| 6,138,831 | A * | 10/2000 | Agostinelli | B60R 7/04 220/345.5 |
| 6,276,419 | B1 * | 8/2001 | Maruyama | B29C 66/8227 156/583.8 |
| 6,370,847 | B1 * | 4/2002 | Jensen | B65F 1/062 53/370 |
| 6,595,381 | B1 * | 7/2003 | Johnson | A45C 5/04 220/345.1 |
| 6,835,273 | B1 * | 12/2004 | Vargas | B25B 5/06 156/290 |
| 6,935,067 | B1 * | 8/2005 | Richter | A01K 97/01 43/4 |
| 7,114,629 | B2 * | 10/2006 | Panek, Jr. | A61B 50/36 220/908 |
| 7,350,663 | B2 * | 4/2008 | Chomik | B65F 1/163 220/264 |
| 8,333,293 | B2 * | 12/2012 | Morand | B65F 1/1607 220/264 |
| 8,348,080 | B2 * | 1/2013 | Baptiste | B65F 1/1468 220/908 |
| 8,851,282 | B2 * | 10/2014 | Brunner | B25H 3/028 220/345.5 |
| 8,888,054 | B1 * | 11/2014 | Peterson | B62B 1/266 280/654 |
| 9,358,746 | B1 * | 6/2016 | Pellegrini | B65F 1/1623 |
| 9,598,194 | B2 * | 3/2017 | Shimanuki | B65F 1/062 |
| 10,301,047 | B2 * | 5/2019 | Otxoa-Aizpurua Calvo | B65B 9/20 |
| 10,421,567 | B2 * | 9/2019 | Bocks | B65B 31/024 |
| 10,654,647 | B2 * | 5/2020 | Chakravarthy | B65F 1/062 |
| 10,934,041 | B2 * | 3/2021 | Lank | B29C 66/9141 |
| 11,655,061 | B2 * | 5/2023 | Johnson | B29C 66/8618 53/469 |
| 11,772,333 | B2 * | 10/2023 | Lank | B29C 66/91421 53/452 |
| 12,110,174 | B1 * | 10/2024 | Faiton | B65F 1/065 |
| 2001/0005969 | A1 * | 7/2001 | Focke | B29C 66/723 53/374.9 |
| 2004/0065051 | A1 * | 4/2004 | Patterson | B65B 51/146 53/510 |
| 2004/0149766 | A1 * | 8/2004 | Karpisek | B65D 19/12 220/812 |
| 2004/0194433 | A1 * | 10/2004 | Chomik | B65F 1/062 53/469 |
| 2005/0016983 | A1 * | 1/2005 | Baptista | B29C 66/43121 219/244 |
| 2005/0194385 | A1 * | 9/2005 | Lu | B65F 1/1623 220/908 |
| 2006/0124194 | A1 * | 6/2006 | Russell | B65B 31/08 141/65 |
| 2006/0254219 | A1 * | 11/2006 | Alipour | B65D 81/2038 53/512 |
| 2007/0028566 | A1 * | 2/2007 | Sferrazza | B65B 31/08 53/512 |
| 2007/0039288 | A1 * | 2/2007 | Clarke | B65B 31/08 53/469 |
| 2007/0062953 | A1 * | 3/2007 | Lin | B65F 1/16 220/345.5 |
| 2008/0000204 | A1 * | 1/2008 | Turvey | B65B 31/024 53/512 |
| 2008/0308607 | A1 * | 12/2008 | Timm | A61B 17/07207 227/176.1 |
| 2009/0020230 | A1 * | 1/2009 | Chang | B29C 66/8416 156/579 |
| 2009/0034886 | A1 * | 2/2009 | Conforti | B65F 1/1415 206/459.1 |
| 2009/0038265 | A1 * | 2/2009 | Torre | B29C 66/1122 53/371.9 |
| 2009/0127260 | A1 * | 5/2009 | Rousso | B65F 1/163 220/495.01 |
| 2010/0032098 | A1 * | 2/2010 | Lalli | B29C 66/8614 156/359 |
| 2010/0083616 | A1 * | 4/2010 | Place | B65F 1/062 53/329.3 |
| 2010/0201090 | A1 * | 8/2010 | Henniges | B65F 1/1468 383/42 |
| 2011/0309082 | A1 * | 12/2011 | Morand | B65F 1/1607 220/495.08 |
| 2012/0037627 | A1 * | 2/2012 | Finnestad | B65D 51/18 220/254.1 |
| 2012/0209314 | A1 * | 8/2012 | Weir | A61B 90/06 606/205 |
| 2012/0292369 | A1 * | 11/2012 | Munro, III | A61K 51/1282 227/176.1 |
| 2012/0297734 | A1 * | 11/2012 | Dinardo | B65B 9/06 53/450 |
| 2013/0221016 | A1 * | 8/2013 | Sekse | B65D 90/623 220/833 |

(56) References Cited

U.S. PATENT DOCUMENTS

| | | | |
|---|---|---|---|
| 2014/0202116 A1* | 7/2014 | Bell | B65F 1/06 |
| | | | 53/425 |
| 2014/0208499 A1* | 7/2014 | Livingston | A47K 11/026 |
| | | | 4/484 |
| 2015/0203293 A1* | 7/2015 | Boesch | B65F 1/1623 |
| | | | 220/813 |
| 2016/0009490 A1* | 1/2016 | Scherer | B65F 1/02 |
| | | | 220/523 |
| 2016/0144988 A1* | 5/2016 | Kwon | B65B 51/146 |
| | | | 53/86 |
| 2017/0015447 A1* | 1/2017 | Jung | B65B 7/2878 |
| 2018/0170599 A1* | 6/2018 | Bierschenk | B29C 66/4312 |
| 2019/0276230 A1* | 9/2019 | Bilton | B65F 1/0013 |
| 2019/0382143 A1* | 12/2019 | Verma | B65B 31/044 |
| 2019/0382196 A1* | 12/2019 | Li | B65F 1/062 |
| 2020/0156866 A1* | 5/2020 | Howse | B65F 1/1436 |
| 2020/0207543 A1* | 7/2020 | Tai | B65F 1/16 |
| 2020/0276768 A1* | 9/2020 | Lank | B29C 66/8161 |
| 2021/0309453 A1* | 10/2021 | Wu | B65F 1/002 |
| 2022/0380075 A1* | 12/2022 | Bowden | B65B 31/042 |
| 2023/0182998 A1* | 6/2023 | Ge | B65F 1/06 |
| | | | 220/495.06 |
| 2023/0365284 A1* | 11/2023 | Razzaboni | B65B 51/146 |
| 2024/0059480 A1* | 2/2024 | Rykowski | B65B 57/00 |
| 2024/0270486 A1* | 8/2024 | Morrison | B65F 1/062 |

\* cited by examiner

VACUUM PACKAGING DEVICE

CROSS-REFERENCE TO RELATED APPLICATIONS

This application claims priority to Chinese Patent Application No. 202311015439.7, filed on Aug. 10, 2023, which is hereby incorporated by reference in its entirety.

TECHNICAL FIELD

The present invention relates to the field of cat litter packaging, in particular to a vacuum packaging device.

BACKGROUND

The automatic cat litter boxes currently available wrap excrement with cat litter, and the drum inside the automatic cat litter box then rotates to separate the contaminated cat litter from the clean cat litter box. The separated contaminated cat litter is all collected and stored in a container below the automatic cat litter box. Due to weather conditions, the contaminated cat litter will breed bacteria and ferment and the contaminated cat litter, which itself emits foul odor, will lead to bacteria growth after being stored for a period of time, and produce even more unbearable odor after fermentation, causing huge contamination and poor experience to users of automatic cat litter boxes.

SUMMARY

The main purpose of the present invention is to propose a vacuum packaging device aimed at addressing the problems indicated in the background art.

To achieve the above objectives, the present invention proposes a vacuum packaging device, including:

a shell having a hollow area for garbage bags to vertically pass through;

a fixture, located on the shell, which can partially close and clamp the garbage bag through the closing action of the clamping portion, and a poking portion on the inner side of the clamping portion pokes out an air hole in the locale after clamping;

a vacuum pumping mechanism, which is located on the shell and can vacuum the garbage bag through the air hole, and a heating element, which is located in the fixture and used to locally fuse and maintain vacuum sealing after the garbage bag is vacuumized.

The technical solution in the present invention provides a hollow area on the shell that allows garbage bags pass through vertically. The clamping portion of the fixture partially closes and clamps the garbage bag located in the hollow area through a closing action, and the poking portion on the inner side of the clamping portion pokes out an air hole in the locale; after the vacuum pumping mechanism vacuums the garbage bag containing waste cat litter through the air hole, the heating element fuses to separate the garbage bag containing waste cat litter from the garbage bag body, so that the garbage bag containing waste cat litter is vacuum sealed and packaged. Compared with traditional methods, the present invention having a simple structure can automatically implement vacuum packaging to isolate waste cat litter from the outside and effectively address the pollution caused by bacterial growth and fermentation after long-term storage of waste cat litter.

DESCRIPTION OF EMBODIMENTS

Figure 1:
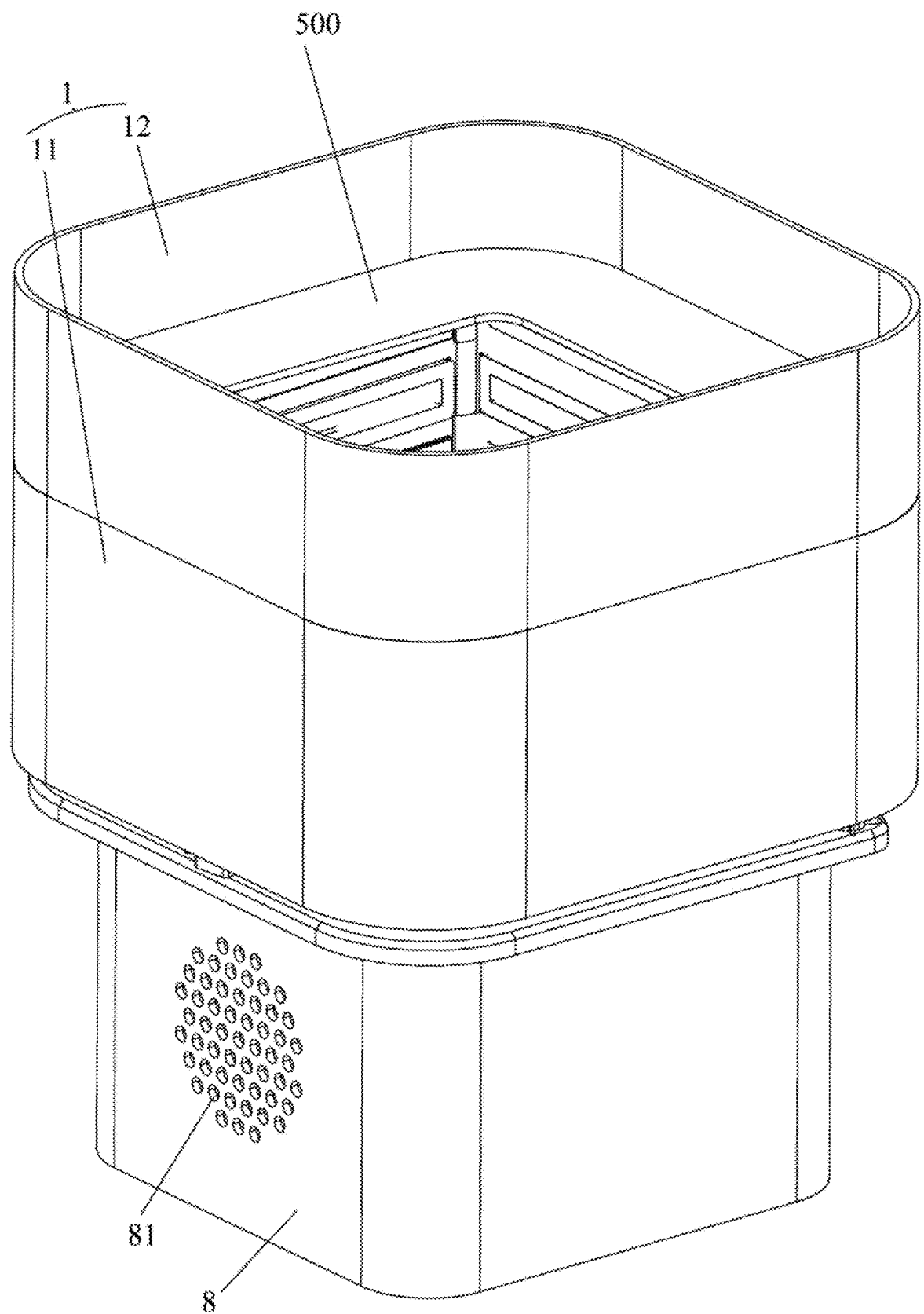
FIG. 1 is a three-dimensional view of the present invention.

A clear and complete description of the technical aspect of the embodiments of the present application will be given below in connection with the accompanying drawings of the present application, and it will be apparent that the described embodiments are only part of the embodiments of the present application, and not all of them. Based on the embodiments in the application, all other embodiments obtained by those of ordinary skill in the art without creative work fall within the claimed scope of the application.

It should be noted that all directional indications (such as top, bottom, left, right, front, rear, etc.) in embodiments of the present application are only used to explain the relative positional relationship, motion situation, etc. Between parts under a specific posture (as shown in the drawings). If the specific posture changes, the directional indications also change accordingly.

In addition, descriptions of "first", "second" and the like in the present application are used for descriptive purposes only and cannot be understood as indicating or implying their relative importance or implying the number of indicated technical features. Therefore, features defined as "first", "second" may explicitly or implicitly include at least one of the features. In addition, the meaning of "and/or" appearing in the full text is to include three parallel schemes. Take "A and/or B" as an example, it includes Scheme A, Scheme B, or Scheme A and B satisfying at the same time. In addition, the technical solutions between various embodiments can be combined with each other, but must be based on the ability of one of ordinary skill in the art to realize, and when the combination of technical solutions is inconsistent or cannot be realized, it should be considered that the combination of such technical solutions does not exist and is not within the claimed scope of the present application.

The present invention proposes a vacuum packaging device.

Figure 2:
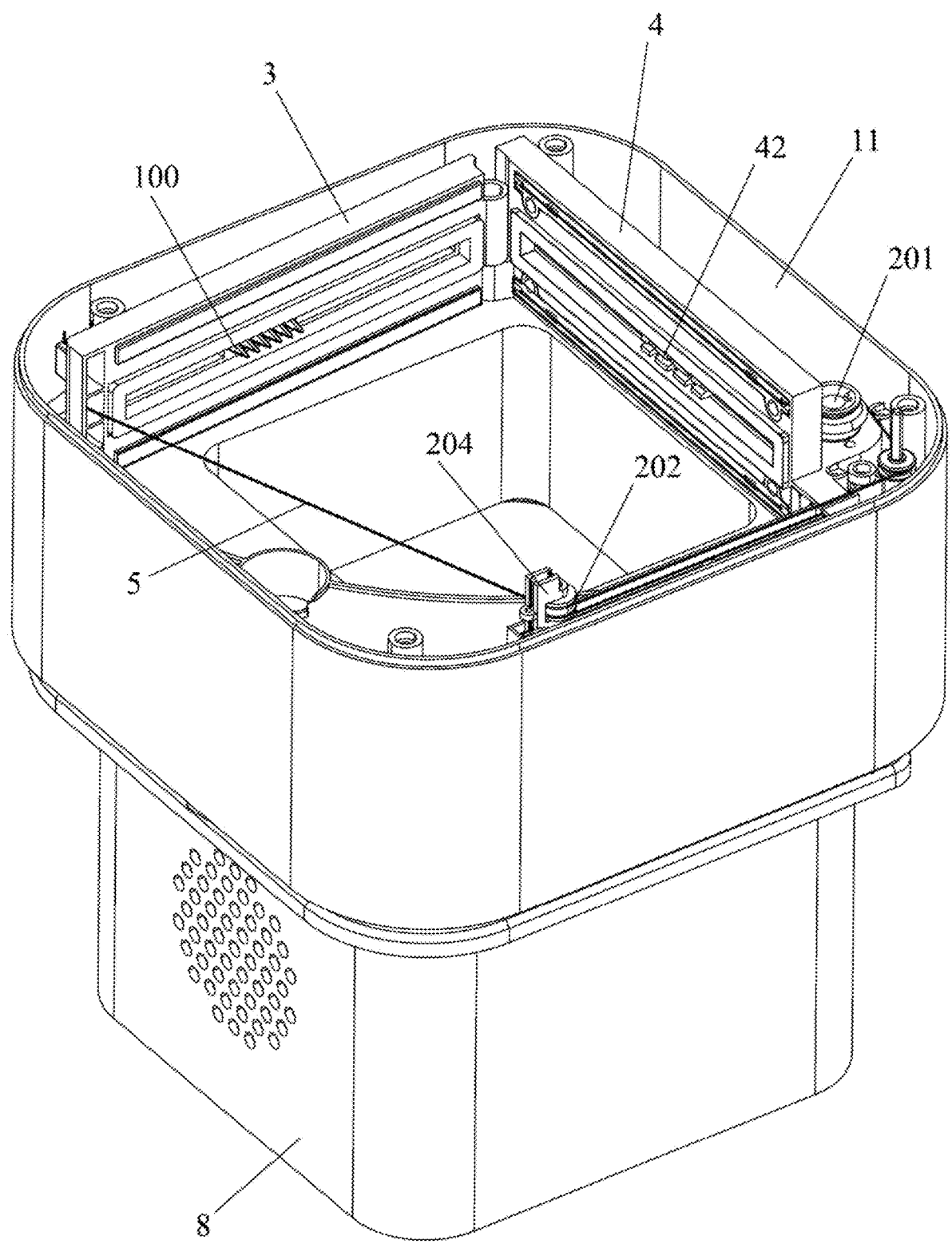
FIG. 2 is an assembly diagram of the bottom shell, fixture, and storage box.
Figure 3:
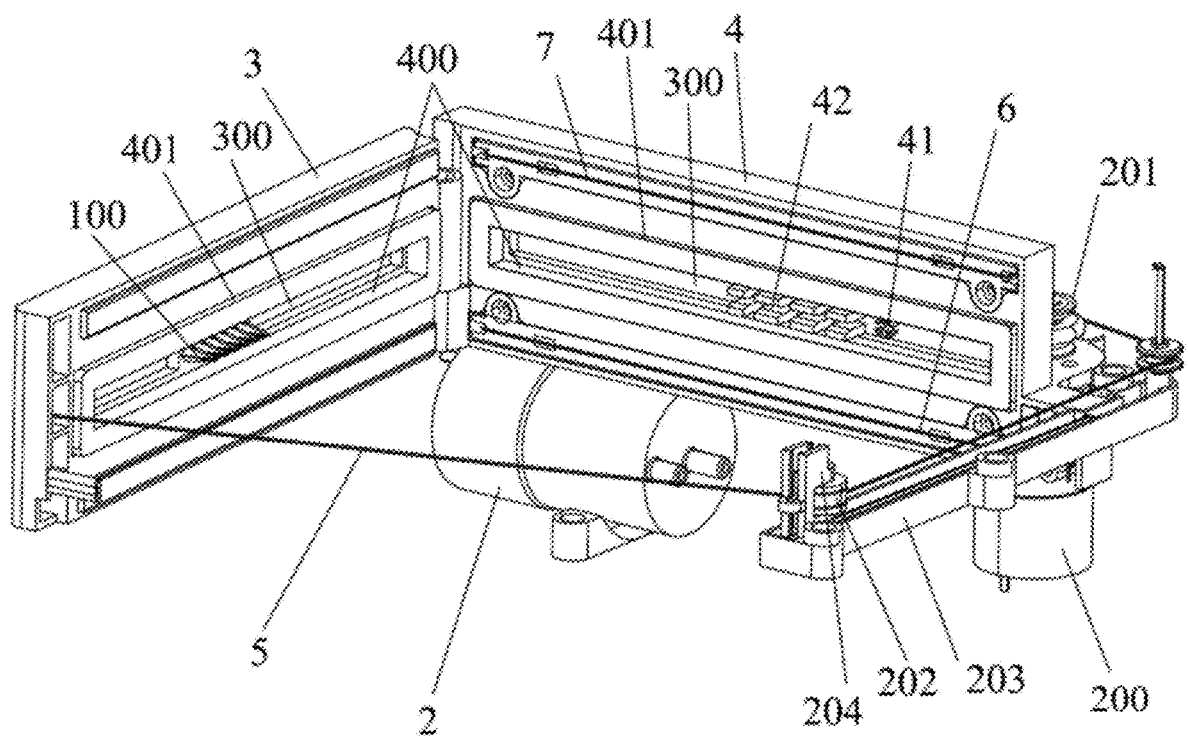
FIG. 3 is an assembly diagram of the bottom shell and fixture.
Figure 4:
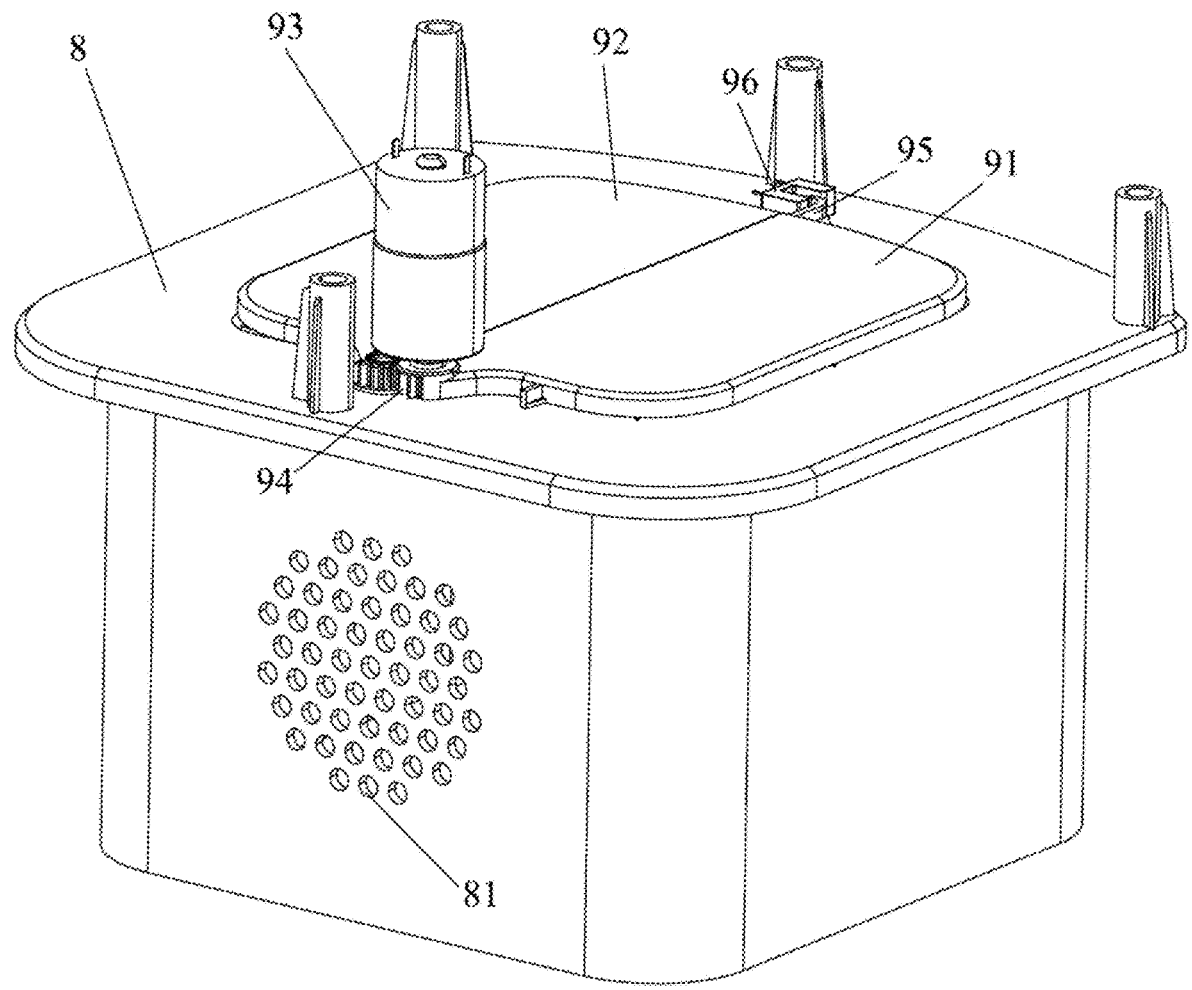
FIG. 4 is an assembly diagram of the storage box, first plate-shaped member, second plate-shaped member, and servo motor.

In the embodiments of the present invention, as shown in FIGS. 1 to 4, the vacuum packaging device includes a shell, a fixture, a vacuum pumping mechanism, and a heating element.

The shell 1 has a hollow area for garbage bags to vertically pass through; the fixture, located on the shell 1, can partially close and clamp the garbage bag through the closing action of the clamping portion, and a poking portion 100 on the inner side of the clamping portion pokes out an air hole in the locale after clamping; the vacuum pumping mechanism 2, located on the shell 1, can vacuum the garbage bag through the air hole, and the heating element is located in the fixture and used to locally fuse and maintain vacuum sealing after the garbage bag is vacuumized.

The technical solution in the present invention provides a hollow area on the shell that allows garbage bags pass through vertically. The clamping portion of the fixture partially closes and clamps the garbage bag located in the hollow area through a closing action, and the poking portion on the inner side of the clamping portion pokes out an air hole in the locale; after the vacuum pumping mechanism vacuums the garbage bag containing waste cat litter through the air hole, the heating element fuses to separate the garbage bag containing waste cat litter from the garbage bag body, so that the garbage bag containing waste cat litter is vacuum sealed and packaged. Compared with traditional methods, the present invention having a simple structure can automatically implement vacuum packaging to isolate waste cat litter from the outside and effectively address the pollution caused by bacterial growth and fermentation after long-term storage of waste cat litter.

Specifically, the garbage bag body used in the present invention is in a long strip shape and, when the cat litter box is used for the first time, the cat litter can be manually poured into the bag, or used in conjunction with an automatic cat litter box, the automatic cat litter box automatically cleans up and pours the waste cat litter into the lower end of the garbage bag body in the hollow area, the weight of the waste cat litter forces the lower end of garbage bag body to descend into the hollow area, and after vacuuming, fusing and sealing, the packaging bag in the vacuum sealed condition is separated, and a new lower end is formed after the garbage bag body is fused, and the garbage bag body can be reused until it is completely consumed, and a new garbage bag body then can be replenished.

Specifically, the fixture includes a driving mechanism and a clamping portion, the clamping portion include a swing arm 3 and a fixed arm 4 that are disposed on the shell 1, the swing arm 3 can swing between the positions where the swing arm 3 maintains horizontal contact with and disengaged from the fixed arm 4, and the driving mechanism is used to drive the swing arm 3 to swing.

Specifically, the swing arm 3 and the fixed arm 4 are elongated plate-shaped members, and the fixed arm 4 is vertically fixed to the peripheral position of the hollow area corresponding to the shell 1. One end of the swing arm 3 is hinged with one end of the fixed arm 4. When the swing arm 3 is swinging in the direction in which it maintains horizontal contact with the fixed arm 4, the swing arm 3 can push the local part towards the fixed arm 4 through the hollow area, thereby closing and clamping the local part.

It should be noted that the garbage bag will wrinkle when closed, so that the air holes can still extract air through the wrinkles after the local part is completely clamped. In order to better extract air, in this embodiment, the garbage bags with a plurality of protruding particles on the surface are used. After the garbage bag is closed and clamped, the local part forms a gap for air circulation through a plurality of protruding particles, providing better air extraction.

Specifically, the driving mechanism includes a rotating motor 200 (or a motor) and a pulling rope 5, one end of the pulling rope 5 is connected to the swinging arm 3, and the other end is connected to the rotating end of the rotating motor 200, and the pulling rope 5 can drive the swinging arm 3 to swing while the rotating end rotates.

Specifically, the rotating motor 200 is fixed on one side of the fixed arm 4, and the rotating end of the rotating motor 200 is fixed with a wire wheel 201 connected to the pulling rope 5, and the rotating end in rotation (such as during forward rotation) makes the pulling rope 5 wrap around, or (during backward rotation) release the wrapping around the wire wheel 201, the outer position in the corresponding hollow area of the shell 1 is provided with a transmission wheel 202 that can move between the free end and the away position of the fixed arm 4, and the transmission wheel 202 maintains local contact with the pulling rope 5 to forces the pulling rope 5 to bend outside the hollow area, and the pulling rope 5 drives the transmission wheel 202 to approach the fixed arm 4 while driving the swing arm 3 to approach the fixed arm 4, and additionally a first tension spring (not shown in the figure) and a second tension spring (not shown in the figure) are provided, the first tension spring is used to apply a pulling force to make the transmission wheel 202 move away from the fixed arm 4, and the second tension spring is used to apply a pulling force to make the swinging arm 3 swing away from the fixed arm 4.

Specifically, a guide rail 203 and a slider 204 are also provided, the slider 204 can move along the guide rail 203, and the transmission wheel 202 can pivot on the slider 204. An included angle of less than or equal to 90° is formed between the swing arm 3 and the fixed arm 4, and the length of guide rail 203 is proportional to the range of the included angle. The further the slider 204 is away from the fixed arm 4, the larger the included angle, and the closer the slider 204 is to the fixed arm 4, the smaller the included angle.

Specifically, a strip groove 300 is provided on the side where the swing arm 3 and the fixed arm 4 maintain contact, the two strip grooves 300 are connected to form a accommodation space when the swing arm 3 and the fixed arm 4 are in contact, a poking portion 100 is disposed in the strip groove 300 of the swing arm 3, and the suction end of the vacuum pumping mechanism 2 is connected to the accommodation space.

Specifically, a through-hole 41 that runs through the fixed arm 4 is disposed in the strip groove 300 of the fixed arm 4, and the through-hole 41 is connected to the suction end of the vacuum pumping mechanism 2 through a pipeline.

Specifically, a plurality of poking portions 100 are spaced along the length direction of the strip groove 300 located in the swing arm 3, and a corresponding insertion position 42 for insertion through the poking portion 100 is provided in the strip groove 300 of the fixed arm 4, and the combination between the insertion position 42 and the poking portion 100 makes it easier to poke an air hole on the garbage bag.

Specifically, the poking portion 100 is conical in shape.

Specifically, a sealing ring 400 is provided inside the strip groove 300, and the sealing ring 400 partially extends out of the strip groove 300 to form a contact portion 401, and the two contact portions 401 maintain elastic contact to form a sealed accommodation space. when the swing arm 3 is in contact with the fixed arm 4.

Specifically, the sealing ring 400 is preferably made of high-temperature resistant silicone or rubber.

Specifically, the heating element includes a first heating wire 6, and the first heating wire 6 is disposed below the corresponding strip groove 300 of the fixed arm 4. After vacuuming, the position below the local corresponding air hole can be fused through the first heating wire 6, thereby maintaining the garbage bag vacuum sealed.

Specifically, the heating element further includes a second heating wire 7, and the second heating wire 7 is disposed above the corresponding strip groove 300 of the fixed arm 4, and the second heating wire 7 will fuse the position above the corresponding air hole in the local part, thereby avoiding the existence of air holes in the garbage bag during the next use, which may prevent vacuum pumping and vacuum sealing.

It should be noted that prior art can be referenced for the first heating wire 6 and the second heating wire 7, and their specific structures will not be further elaborated here.

Specifically, the bottom of the shell 1 is provided with a storage box 8 that defines a storage space with a top opening, the storage space is connected to the bottom opening of the hollow area, and a cover body is also provided, and the cover body is movably disposed on the top of the storage box 8 and can move between the positions that connect and disconnect the storage space.

Specifically, the cover body includes a first plate-shaped member 91 and a second plate-shaped member 92, the first plate-shaped member 91 and the second plate-shaped member 92 can move horizontally between the position that closes the storage space and the position that opens the storage space, a servo motor 93 (or a motor) is also used to drive the first plate-shaped member 91 and the second plate-shaped member 92 to perform the motion.

Specifically, the first plate-shaped member 91 and the second plate-shaped member 92 are interconnected through a gear structure 94, the servo motor 93 is vertically fixed above the first plate-shaped member 91 corresponding to the shell 1, and the rotating end of the servo motor 93 is fixedly connected to (the gear on) the first plate-shaped member 91, used to drive the first plate-shaped member 91 to perform a horizontal swing action, while the gear structure 94 drives the second plate-shaped member 92 to perform horizontal movement, thereby closing or opening the top opening of the storage space.

Specifically, the top of storage box 8 and the bottom of shell 1 are detachably and fixedly connected through screw locking or through a buckle structure.

Specifically, a sensing portion 95 is formed on one side of the first plate-shaped member 91 away from the gear structure 94, and sensing elements 96 are provided on the top of the storage box 8, and the combination of the sensing elements 96 and the sensing portion 95 can sense whether the storage space is closed.

Specifically, one side of the storage box 8 is provided with a plurality of openings 81 connected to the storage space.

Specifically, the vacuum pumping mechanism 2 is a vacuum pump that falls within the scope of the prior art, and its specific structural principle will not be elaborated here.

Specifically, the shell 1 includes a bottom shell 11 and an upper cover 12 that are connected up-and-down, and the top of the upper cover 12 is provided with an accommodation space 500, and the accommodation space 500 is connected to the top opening of the hollow area and is used to accommodate the waste bags.

The foregoing is only an alternative embodiment of this application and is not thus limiting the scope of this application. Any equivalent structural transformation made under the inventive concept of the application using the contents of this specification and the accompanying drawings, or direct/indirect application in other related technical fields, is included in the scope of the application.

What is claimed is:

1. A vacuum packaging device, including:
    a shell having a hollow area for garbage bags to vertically pass through;
    a fixture, located on the shell, which can partially close and clamp the garbage bags through the closing action of a clamping portion, and a poking portion on an inner side of the clamping portion pokes out an air hole in a locale after clamping;
    a vacuum pumping mechanism, which is located on the shell and can vacuum the garbage bags through the air hole, and
    a heating element, which is located in the fixture and used to locally fuse and maintain vacuum sealing after the garbage bags are vacuumized;
    wherein the fixture comprises a driving mechanism and a clamping portion, the clamping portion comprises a swing arm and a fixed arm that are disposed on the shell, the swing arm can swing be ween positions where the swing arm maintains horizontal contact with and disengaged from the fixed arm, and the driving mechanism is used to drive the swing arm to swing;
    wherein the driving mechanism comprises a rotating motor and a pulling rope one end of the pulling rope is connected to the swing arm, and the other end of the pulling rope is connected to a rotating end of the rotating motor, and the polling rope can drive the swing arm to swing while the rotating end rotates;
    wherein the rotating motor is fixed on one side of the fixed arm, and the rotating end of the rotating motor is fixed with a wire wheel connected to the pulling rope, and the rotating end in rotation makes the pulling rope wrap around or release the wrapping around the wire wheel, an outer position in the corresponding hollow area of the shell is provided with a transmission wheel that can move between a free end and an away position of the fixed arm, and the transmission wheel maintains local contact with the pulling rope to forces the pulling rope to bend outside the hollow area, and the pulling rope drives the transmission wheel to approach the fixed arm while driving the swing arm to approach the fixed arm, and a first tension spring and a second tension spring are further provided, the first tension spring is used to apply a pulling force to make the transmission wheel move away from the fixed arm, and the second tension spring is used to apply a pulling force to make the swing arm swing away from the fixed arm.

2. The vacuum packaging device according to claim 1, wherein strip grooves are provided on one side where the swing arm and the fixed arm maintain contact, the strip grooves are connected to form an accommodation space when the swing arm and the fixed arm are in contact,
    a poking portion is disposed in the strip grooves of the swing arm, and a suction end of the vacuum pumping mechanism is connected to the accommodation space.

3. The vacuum packaging device according to claim 2, wherein a through-hole that runs through the fixed arm is disposed in the strip grooves of the fixed arm, and the through-hole is connected to the suction end of the vacuum pumping mechanism through a pipeline.

4. The vacuum packaging device according to claim 2, wherein there are a plurality of poking portions that are spaced along a length direction of the strip grooves located in the swing arm, and a corresponding insertion position for insertion through the poking portions is provided in the strip grooves of the fixed arm.

5. The vacuum packaging device according to claim 2, wherein sealing rings are provided inside the strip grooves, and the sealing rings partially extend out of the strip grooves to form contact portions, and the contact portions maintain elastic contact when the swing arm is in contact with the fixed arm.

6. The vacuum packaging device according to claim 2, wherein the heating element includes a first heating wire, and the first heating wire is disposed below the corresponding strip grooves of the fixed arm.

7. The vacuum packaging device according to claim 6, wherein the heating element further includes a second heating wire, and the second heating wire is disposed above the corresponding strip grooves of the fixed arm.

8. The vacuum packaging device according to claim 1, wherein a bottom of the shell is provided with a storage box that defines a storage space with a top opening, the storage space is connected to a bottom opening of the hollow area, and a cover body is also provided, and the cover body is movably disposed on a top of the storage box and can move between positions that connect and disconnect the storage space.

9. The vacuum packaging device according to claim 8, wherein the cover body includes a first plate-shaped member and a second plate-shaped member, the first plate-shaped member and the second plate-shaped member can move horizontally between a position that closes the storage space and a position that opens the storage space, a servo motor is also used to drive the first plate-shaped member and the second plate-shaped member to perform motions.

10. The vacuum packaging device according to claim 9, wherein the first plate-shaped member and the second plate-shaped member are interconnected through a gear structure, the servo motor is vertically fixed above the first plate-shaped member corresponding to the shell, and a rotating end of the servo motor is fixedly connected to the first plate-shaped member, used to drive the first plate-shaped member to perform a horizontal swing action.

11. The vacuum packaging device according to claim 1, wherein the shell includes a bottom shell and an upper cover that are connected an up-and-down direction, and a top of the upper cover is provided with an accommodation space, and the accommodation space is connected to a top opening of the hollow area.

\* \* \* \* \*